United States Patent [19]

Clark et al.

[11] 4,028,156
[45] June 7, 1977

[54] PLASTIC CONTAINER AND CLOSURE COLLAR COMBINATION AND METHOD

[75] Inventors: James L. Clark, Whitefish Bay; Byron L. Mather, Milwaukee, both of Wis.

[73] Assignee: Plastronics, Inc., Milwaukee, Wis.

[22] Filed: Jan. 2, 1976

[21] Appl. No.: 646,124

Related U.S. Application Data

[62] Division of Ser. No. 499,008, Aug. 19, 1974, abandoned.

[52] U.S. Cl. .................. 156/69; 150/8; 156/215; 156/272; 156/303.1; 215/31; 222/107; 222/215; 222/566; 428/35
[51] Int. Cl.² .......................................... B29C 27/04
[58] Field of Search .......... 156/69, 272, 293, 202, 156/203, 275, 215, 303.1; 222/107, 215, 566; 150/8; 215/31; 428/35

[56] References Cited
UNITED STATES PATENTS

| | | |
|---|---|---|
| 2,476,446 | 7/1949 | Lindell .................. 222/107 |
| 2,645,591 | 7/1953 | Makrauer .................. 156/227 |
| 2,681,296 | 6/1959 | Dobbs et al. .................. 156/227 |
| 2,919,747 | 1/1960 | Post .................. 156/227 |
| 3,656,668 | 4/1972 | Liebertz .................. 222/107 |
| 3,675,812 | 7/1972 | Foster .................. 222/153 |
| 3,753,819 | 8/1973 | Mollura .................. 156/203 |
| 3,778,321 | 12/1973 | Abbott .................. 156/69 |

Primary Examiner—Edward G. Whitby
Attorney, Agent, or Firm—Michael, Best & Friedrich

[57] ABSTRACT

A closure collar member having a circular groove formed therein is attached to the tubular neck portion of a plastic container by first inserting the neck into and partially through a tubular mandril member so that the end portion of the neck will extend out the end of the mandril. The neck is then folded over the edge of the mandril and the collar member is then positioned on the mandril so that the folded edge portion of the neck will become fully inserted into the circular groove formed in the collar member. The folded edge of the neck is then fused to the collar member at the root of the circular groove to complete the seal between the parts.

1 Claim, 4 Drawing Figures

PLASTIC CONTAINER AND CLOSURE COLLAR COMBINATION AND METHOD

CROSS REFERENCE TO RELATED APPLICATION

This application is a division of our application Ser. No. 499,008, filed Aug. 19, 1974, now abandoned.

BACKGROUND OF THE INVENTION

I. Field of the Invention

This invention relates to a combination closure collar and plastic container and the method of attaching the collar to the container. The completed device can be used as an enema bag as one example.

II. Description of the Prior Art

Applicants are unaware of any attachment arrangements and/or methods of making them which are similar to that of the present invention.

SUMMARY OF THE INVENTION

A plastic container and closure collar combination comprising a collar member having a circular spout portion with a pair of inner and outer circular skirt portions depending therefrom to produce a circular groove therebetween. The plastic container has a tubular neck portion which is folded over on itself and positioned inside the circular groove of the collar member with the folded edge of the neck member fused to the collar member at the root of the groove.

DESCRIPTION OF THE PREFERRED EMBODIMENT

Figure 1:
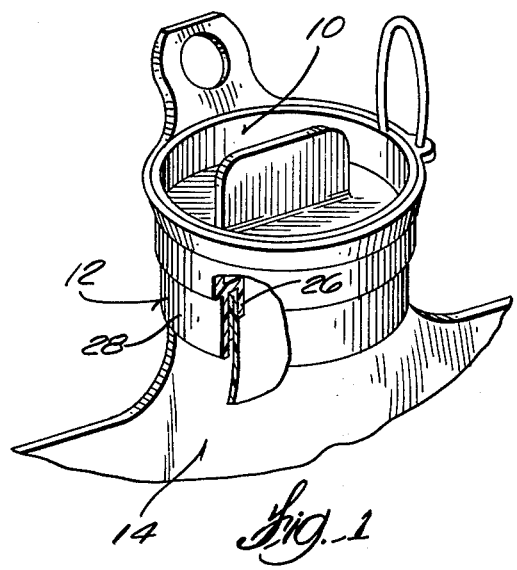
FIG. 1 is a perspective view with parts broken away of the completed container closure construction of the present invention.

The plastic container closure construction shown in FIG. 1 is comprised of three basic parts, a cap member 10, a collar member 12 and a plastic container or bag 14. The particular construction of cap member 10 and that portion of collar 12 which serves to establish a removable mounting of the cap in the collar is not a part of the present invention and will thus not be described in detail herein. As previously indicated, the present invention is concerned particularly with the sealed attachment construction between collar 12 and the tubular neck portion 16 of bag 14 and the method of making such attachment.

Figure 2:
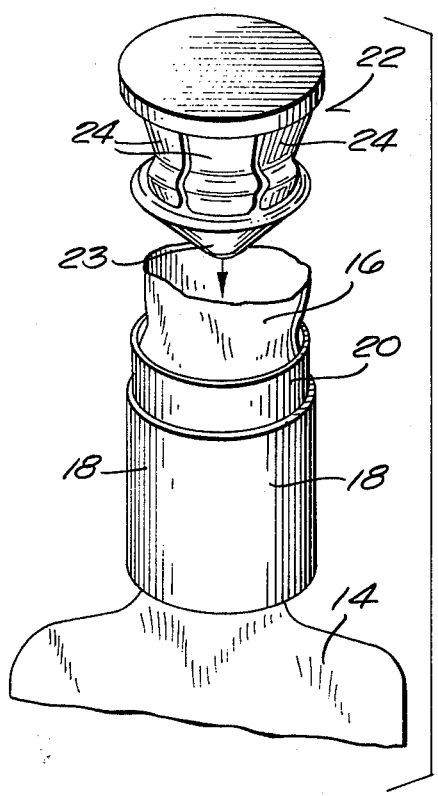
FIG. 2 is a perspective view showing the first step of the method of attachment between the collar and the plastic container.

The first step of the attachment method is to insert the neck 16 of the bag 14 up into and partially through a tubular mandrel member 18 so that the end portion of the neck will extend out the end of the mandril as shown in FIG. 2. In the preferred embodiment bag 14 is made of vinyl plastic sheet material, collar 12 is made of polyvinyl chloride and mandril member 18 is made of stainless steel.

Figure 3:
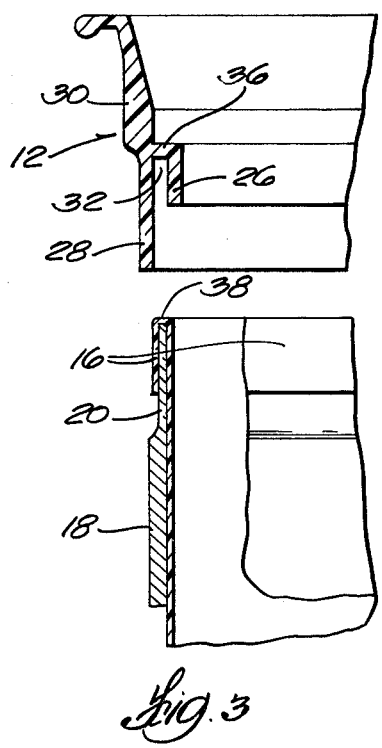

The second step of the attachment method is to fold the end portion of neck 16 down and over the top end edge of mandril 18 from the position shown in FIG. 2 to the position shown in FIG. 3. It will be noted that the external surface at the top end of mandril 18 has been necked down as indicated by reference numeral 20. The folding step can be accomplished in any suitable way including a manual folding of the neck 16. In the preferred embodiment it is accomplished by the use of a collapsible tool 22, the tip portion 23 of which is pressed downwardly inside of neck 16 as indicated by the arrow in FIG. 2. As the tool 22 is pressed downwardly, flexible finger members 24 thereof will be forced downwardly and outwardly around the necked down portion 20 of mandril 18 which action in turn will fold neck 16 of the bag from the position shown in FIG. 2 to the position shown in FIG. 3.

Figure 4:
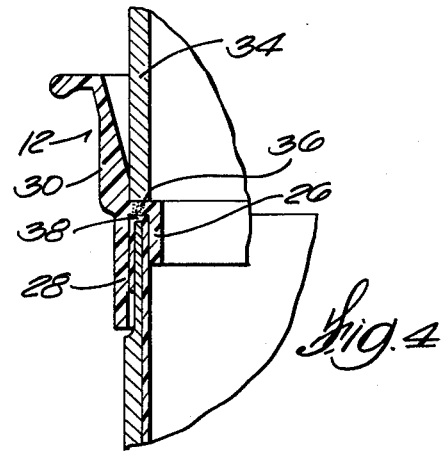
FIGS. 3 and 4 are fragmentary sectional views showing the second and third steps of the attachment method.

With neck 16 folded over the end of the mandril as shown in FIG. 3, the next step is to assemble the collar member 12 on the end of the mandril as shown in FIG. 4. Collar member 12 is provided with a pair of spaced inner and outer circular skirt portions 26 and 28 respectively, which depend from the spout portion 30 on the collar. The space between depending skirts 28 and 26 provides a circular groove 32 dimensioned to snugly receive the folded end portion 16 of the neck of bag 14 as shown in FIG. 4 with the neck folded over the tip of mandril 18.

With the collar, neck and mandril in the position shown in FIG. 4, the final welding step is performed. The welding step can be performed in any suitable manner. In the preferred embodiment a cylindrical welding electrode member 34 is positioned in contact with the collar in alignment with groove 32 as shown in FIG. 4. Radio frequency energy is then transmitted between member 34 and mandril 18 causing the portion 36 of collar 12 at the root of groove 32 to be welded to the folded edge portion 38 of container neck 16. The collar thus becomes mechanically fastened to the spout portion 16 of the plastic bag in a sealed relationship.

We claim:

1. The method of attaching a closure collar member having a circular groove formed therein to the tubular neck portion of a plastic container comprising the steps of:
   a. inserting the tubular neck portion of the plastic container into and partially through a tubular mandril member so that the end portion of the neck will extend out the end of the mandril;
   b. folding the end portion of the neck over the edge of the mandril member;
   c. positioning the collar member on the mandril so that the folded end portion of the neck is inserted fully into the circular groove formed in the collar member; and
   d. fusing the folded edge of the neck to the collar member at the root of the circular groove by passing radio frequency energy through the collar member and bag in the area to be fused to thereby seal the collar to the plastic container, said fusing step being performed by positioning a cylindrical welding electrode in contact with the collar and in alignment with the groove formed therein and then passing the radio frequency energy through the parts.

* * * * *